(12) United States Patent
Danielson

(10) Patent No.: US 12,116,138 B2
(45) Date of Patent: Oct. 15, 2024

(54) MULTI-ELEMENT PROPELLER BLADE DEICER SCHEME FOR BALANCED THREE-PHASE ELECTRICAL LOADS

(71) Applicant: Hamilton Sundstrand Corporation, Charlotte, NC (US)

(72) Inventor: David R. Danielson, Suffield, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 767 days.

(21) Appl. No.: 17/219,096

(22) Filed: Mar. 31, 2021

(65) Prior Publication Data

US 2021/0300573 A1 Sep. 30, 2021

Related U.S. Application Data

(60) Provisional application No. 63/002,793, filed on Mar. 31, 2020.

(51) Int. Cl.
*B64D 15/12* (2006.01)
*B64D 41/00* (2006.01)
(Continued)

(52) U.S. Cl.
CPC ............. *B64D 15/12* (2013.01); *B64D 41/00* (2013.01); *H05B 3/00* (2013.01); *H05B 3/22* (2013.01); *H05B 2214/02* (2013.01)

(58) Field of Classification Search
CPC ........ B64D 15/12; B64D 15/14; B64D 41/00; H05B 3/00; H05B 2214/02; H05B 2203/013; H05B 2203/014; B64C 11/20
See application file for complete search history.

(56) References Cited

U.S. PATENT DOCUMENTS 6,069,341 A * 5/2000 Gage ..................... B64D 15/12
310/239
6,137,082 A * 10/2000 Pruden ................... B64C 11/00
310/239
(Continued)

FOREIGN PATENT DOCUMENTS

EP 2520492 A1 11/2012
GB 2447374 A 9/2008
(Continued)

OTHER PUBLICATIONS

European Search Report Issued in European Application No. 21166282.0-1010 dated Jun. 30, 2021; 9 Pages.
(Continued)

*Primary Examiner* — Shawntina T Fuqua
(74) *Attorney, Agent, or Firm* — CANTOR COLBURN LLP

(57) ABSTRACT

Provided are embodiments for deicing an aircraft propeller having a plurality of blades of an aircraft. An example method includes performing a first heating, by a first plurality of heating elements connected to a first portion of each of the plurality of blades, for a first period of time, the first portion of each of the plurality of blades of the propeller defining a first deicing zone. The method further includes, subsequent to expiration of the first period of time, performing a second heating, by a second plurality of heating elements connected to a second portion of each of the plurality of blades, for a second period of time, the second portion of each of the plurality of blades of the propeller defining a second deicing zone.

20 Claims, 5 Drawing Sheets

(51) Int. Cl.
*H05B 3/00* (2006.01)
*H05B 3/22* (2006.01)

(56) References Cited

U.S. PATENT DOCUMENTS

| | | |
|---|---|---|
| 6,851,929 B2 | 2/2005 | Goldberg |
| 7,604,202 B2 | 10/2009 | Froman et al. |
| 9,656,757 B2 | 5/2017 | Henze |
| 2009/0177326 A1 | 7/2009 | Gaertner, II et al. |
| 2015/0260047 A1* | 9/2015 | Gieras ............... H05B 1/0236 416/95 |

FOREIGN PATENT DOCUMENTS

| | | |
|---|---|---|
| GB | 2449651 A | 12/2008 |
| WO | 2006124026 A1 | 11/2006 |
| WO | WO-2022258849 A1 * | 12/2022 ............. B64C 11/20 |

OTHER PUBLICATIONS

EPO Official Letter for Application No. 21166282.0, mailed Dec. 22, 2022, 5 pages.
EP EPO Official Letter for Application No. 21166282.0, mailed Feb. 21, 2024, 3 pages.

* cited by examiner

MULTI-ELEMENT PROPELLER BLADE DEICER SCHEME FOR BALANCED THREE-PHASE ELECTRICAL LOADS

CROSS-REFERENCE TO RELATED APPLICATIONS

This Application is the Non-Provisional Application, which claims priority to U.S. Provisional Patent Application No. 63/002,793 filed Mar. 31, 2020, the disclosure of which is incorporated herein by reference in their entirety.

BACKGROUND

Embodiments described herein generally relate to deicing techniques, and more specifically to a multi-element propeller blade deicer scheme for balanced three-phase electrical loads.

Deicing systems on aircraft reduce and/or prevent the accumulation of ice on aircraft surfaces such as propellors, wings, rotor blades, control surfaces, and other components. Different types of deicing systems include pneumatic deicing boots, electro-thermal systems, bleed air systems, electro-mechanical systems, among others. Electro-thermal systems use resistive circuits that are disposed within a particular component and that generate heat when a current passes through the resistive circuits. The heat causes the reduction and/or prevention of the accumulation of ice.

BRIEF DESCRIPTION

According to an embodiment, a method for deicing an aircraft propeller having a plurality of blades of an aircraft is provided. The method includes performing a first heating, by a first plurality of heating elements connected to a first portion of each of the plurality of blades, for a first period of time, the first portion of each of the plurality of blades of the propeller defining a first deicing zone, the first deicing zone being formed radially about a center point of the propeller. The method further includes, subsequent to expiration of the first period of time, performing a second heating, by a second plurality of heating elements connected to a second portion of each of the plurality of blades, for a second period of time, the second portion of each of the plurality of blades of the propeller defining a second deicing zone, the second deicing zone being formed radially about the center point of the propeller, the second deicing zone differing from the first deicing zone. While performing the first heating and while performing the second heating, a current is supplied to the respective first plurality of heating elements and the second plurality of heating elements from each of three phases of a three-phase power generation device associated with the aircraft, a load on each of the three phases being balanced.

In addition to one or more of the features described herein, or as an alternative, further embodiments include that one or more of the first plurality of heating elements comprises a first resistive circuit.

In addition to one or more of the features described herein, or as an alternative, further embodiments include that performing the first heating comprises receiving the current from each of the three phases of the three-phase power generation device associated with the aircraft during the first period of time.

In addition to one or more of the features described herein, or as an alternative, further embodiments include that the first resistive circuit comprises a first resistor and a second resistor, the second resistor having twice the resistance of the first resistor.

In addition to one or more of the features described herein, or as an alternative, further embodiments include that one or more of the second plurality of heating elements comprises a second resistive circuit.

In addition to one or more of the features described herein, or as an alternative, further embodiments include that performing the second heating comprises receiving the current from each of the three phases of the three-phase power generation device associated with the aircraft during the second period of time.

In addition to one or more of the features described herein, or as an alternative, further embodiments include that the second resistive circuit comprises a third resistor and a fourth resistor, the fourth resistor having twice the resistance of the third resistor.

In addition to one or more of the features described herein, or as an alternative, further embodiments include that heating the second portion of each of the plurality of blades of the propeller occurs within a threshold time subsequent to expiration of the first period of time.

In addition to one or more of the features described herein, or as an alternative, further embodiments include, subsequent to expiration of the first period of time, waiting a third period of time.

In addition to one or more of the features described herein, or as an alternative, further embodiments include, subsequent to expiration of the third period of time, performing a third heating, by the first plurality of heating elements for the first period of time, the first portion of each of the plurality of blades of the propeller; and subsequent to expiration of the first period of time, performing a fourth heating, by the second plurality of heating elements for the second period of time, the second portion of each of the plurality of blades of the propeller.

In addition to one or more of the features described herein, or as an alternative, further embodiments include that subsequent to expiration of the second period of time, performing a third heating, by the first plurality of heating elements for the first period of time, the first portion of each of the plurality of blades of the propeller.

According to an embodiment, an aircraft is provided. The aircraft includes a propeller comprising a first plurality of heating elements disposed in a plurality of blades of the propeller and a second plurality of heating elements disposed in the plurality of blades of the propeller, wherein each of the plurality of first heating elements is disposed between a center point of the propeller and the respective each of the second heating elements. The aircraft further includes a three-phase power generation device selectively providing a current to the first plurality of heating elements and the second plurality of heating elements. The aircraft further includes a processing device for executing computer readable instructions stored in a memory, the computer readable instructions controlling the processing device to perform operations. The operations include causing heating, by the first plurality of heating elements connected to a first portion of each of the plurality of blades, for a first period of time, the first portion of each of the plurality of blades of the propeller defining a first deicing zone, the first deicing zone being formed radially about a center point of the propeller. The operations further include subsequent to expiration of the first period of time, causing heating, by the second plurality of heating elements connected to a second portion of each of the plurality of blades, for a second period of time, the second portion of each of the plurality of blades of the propeller defining a second deicing zone, the second deicing zone being formed radially about the center point of the propeller, the second deicing zone differing from the first deicing zone. While performing the first heating and while performing the second heating, the current is supplied to the respective first plurality of heating elements and the second plurality of heating elements from each of three phases of the three-phase power generation device, a load on each of the three phases being balanced.

In addition to one or more of the features described herein, or as an alternative, further embodiments include that one or more of the first plurality of heating elements comprises a first resistive circuit.

In addition to one or more of the features described herein, or as an alternative, further embodiments include that performing the first heating comprises receiving the current from each of the three phases of the three-phase power generation device associated with the aircraft during the first period of time.

In addition to one or more of the features described herein, or as an alternative, further embodiments include that the first resistive circuit comprises a first resistor and a second resistor, the second resistor having twice the resistance of the first resistor.

In addition to one or more of the features described herein, or as an alternative, further embodiments include that one or more of the second plurality of heating elements comprises a second resistive circuit.

In addition to one or more of the features described herein, or as an alternative, further embodiments include that performing the second heating comprises receiving the current from each of the three phases of the three-phase power generation device associated with the aircraft during the second period of time.

In addition to one or more of the features described herein, or as an alternative, further embodiments include that the second resistive circuit comprises a third resistor and a fourth resistor, the fourth resistor having twice the resistance of the third resistor.

In addition to one or more of the features described herein, or as an alternative, further embodiments include that heating the second portion of each of the plurality of blades of the propeller occurs within a threshold time subsequent to expiration of the first period of time.

According to an embodiment, a deicing system for deicing a plurality of blades of a propeller is provided. The deicing system includes a first plurality of heating elements and a second plurality of heating elements. The deicing system further includes a processing device for executing computer readable instructions stored in a memory, the computer readable instructions controlling the processing device to perform operations. The operations include causing heating, by the first plurality of heating elements connected to a first portion of each of the plurality of blades, for a first period of time, the first portion of each of the plurality of blades of the propeller defining a first deicing zone, the first deicing zone being formed radially about a center point of the propeller. The operations further include, subsequent to expiration of the first period of time, causing heating, by the second plurality of heating elements connected to a second portion of each of the plurality of blades, for a second period of time, the second portion of each of the plurality of blades of the propeller defining a second deicing zone, the second deicing zone being formed radially about the center point of the propeller, the second deicing zone differing from the first deicing zone. While performing the first heating and while performing the second heating, the current is supplied to the respective first plurality of heating elements and the second plurality of heating elements from each of three phases of the three-phase power generation device, a load on each of the three phases being balanced.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
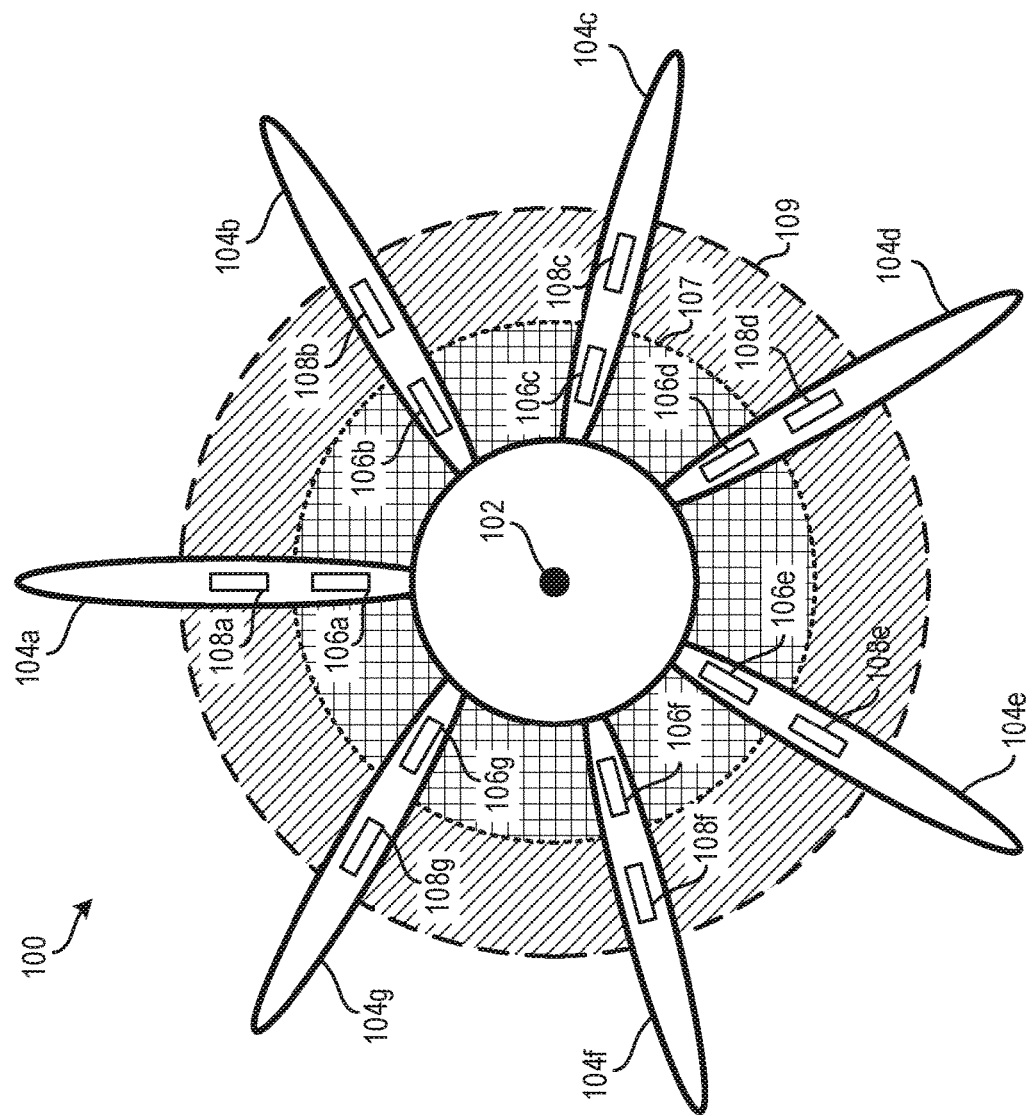
FIG. 1 depicts a cross-sectional view of a propeller having a plurality of deicing (or heating) zones defined radially about a center point of the propeller according to one or more embodiments described herein.

Aircraft can utilize different engine and propeller configurations. For example, an aircraft can utilize a singe engine or multiple engines (e.g., two engines, four engines, etc.). Each engine can have a propeller having a number of blades that can vary across aircraft types. Some aircraft can utilize a two-blade propeller configuration, while other aircraft can utilize multi-blade propeller configurations (e.g., three blades, four blades, five blades, six blades, seven blades, eight blades, etc.).

With some propeller configurations (i.e., different blade counts), it may be difficult to provide a balanced power load to be placed on a power source (e.g., alternator or generator) due to a propeller deicing system. While different propeller deicing and anti-icing zones have been utilized to minimize the peak power demand while approximately balancing the load on the three-phases of an alternator/generator output of the aircraft, a balanced power load is not always achieved. Accordingly, it is desirable to provide a balanced power load from the propeller deicing system to the aircraft power generation system while minimizing peak power demand for the overall propeller ice protection function of the propeller deicing system. As the propeller ice protection system is not always active, a balanced load on the three-phase power generating device is desirable with the propeller ice protection system both active and inactive.

Further, providing for weight-balanced deicing of the propeller blades is desirable. For example, a six-blade propeller configuration can be divided into three zones of two blades each. In such an arrangement, two opposite blades are paired together in a zone. This enables symmetrical weight-balanced deicing so that when ice is released from the blades receiving heating power from the propeller deicing system, the propeller assembly remains roughly in balance and avoids the generation of excessive vibration. However, providing for weight-balanced deicing may be especially difficult for certain blade configurations, such as a seven-blade configuration, that are not easily divisible.

Some conventional propeller deicing systems cycle between powering heaters ON and OFF. Typical heater power ON and power OFF durations establish the heat needed to weaken the bond between any ice that builds up on the propeller blade surface (during the OFF time) while not supplying too much power during the ON time that liquid water can run back to an unheated area on the propeller blade and cause loss of aerodynamic performance.

In periods of severe icing, a traditional duty cycle for the heater is 20 seconds ON followed by 60 seconds OFF, although other durations for ON and OFF times are possible. This allows for four deicing zones to be established and power applied to each zone in sequence such that the peak power requested from the power generation system is only 25% of the power that would be required to power all zones simultaneously. One technique of establishing four deicing zones with a two-propeller aircraft is to define two zones on each propeller.

When defining two zones per propeller on a four, six, or eight bladed propeller, this can be accomplished by defining the even blades as one zone and the odd blades as a second zone. In the event of an odd number of blades on the propeller, this split by entire blades approach is not possible. In the event of a two-bladed propeller, symmetric deicing is not possible when deicing whole blades, unless the peak power request is allowed to increase to 50% rather than the optimum 25% figure, discussed earlier.

The present techniques address these and other shortcomings of the prior art by providing a propeller deicing system having a multi-element propeller blade deicer arrangement for balanced three-phase electrical loads. The disclosed techniques may provide the ability to draw electrical power from a three-phase alternating current (AC) electrical generation system on an aircraft in a balanced manner while minimizing the peak power required for propeller ice protection functions provided by a propeller deicing system.

According to one or more embodiments described herein, the propeller deicing system has multiple heating elements to allow the creation of radial deicing zones on the blades of a propeller. The radial deicing zones are based on radial location of the heating elements rather than the blade location. Deicing zones form concentric circles about the center of the propeller according to some examples. This approach implements multiple power feeds to each deicing zone such that the total electrical load applied to each of the three phases of a three-phase AC power generation system is balanced. This approach reduces generation weight and improves generation reliability. Of note is that beyond a certain radial station on the propeller blade, deicers are no longer needed as the centrifugal forces that exist during propeller rotation are capable of removing any ice build-up without additional heating of the ice/blade interface.

FIG. 1 depicts a cross-sectional view of a propeller 100 having a plurality of deicing (or heating) zones defined radially about a center point 102 of the propeller 100 according to one or more embodiments described herein. In this example, the propeller 100 includes seven blades 104a, 104b, 104c, 104d, 104e, 104f, 104g (referred to collectively as "blades 104"). Although seven blades are shown, it should be appreciated that the present techniques apply to propellers having other numbers of blades (e.g., 2 blades, 3 blades, 4 blades, 5 blades, 6 blades, 7 blades, 8 blades, 9 blades, etc.).

Figure 2:
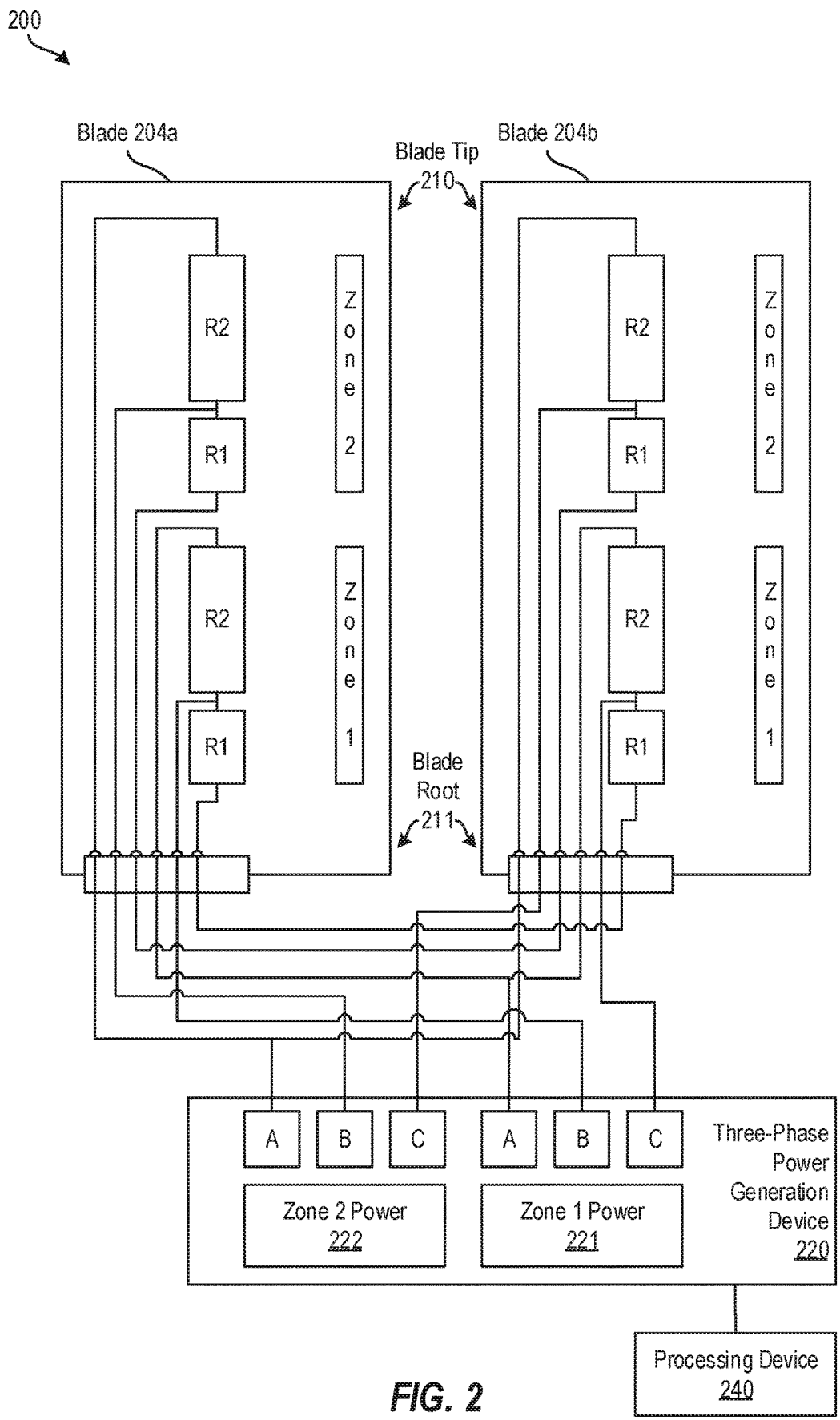
FIG. 2 depicts a circuit diagram of a circuit for deicing a propeller according to one or more embodiments described herein.
Figure 3A:
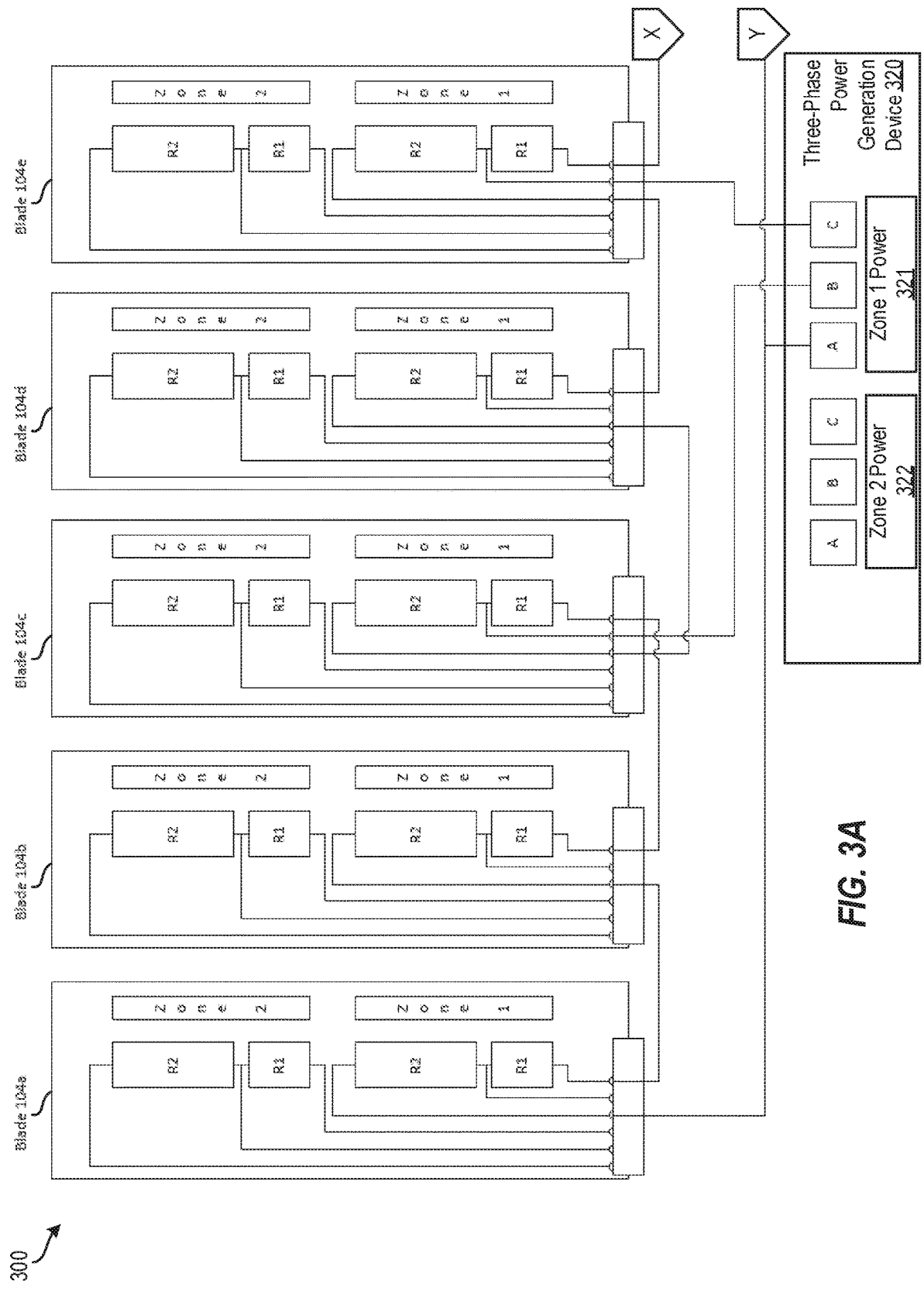
FIGS. 3A and 3B depict a circuit diagram of a circuit for deicing a propeller according to one or more embodiments described herein.
Figure 3B:
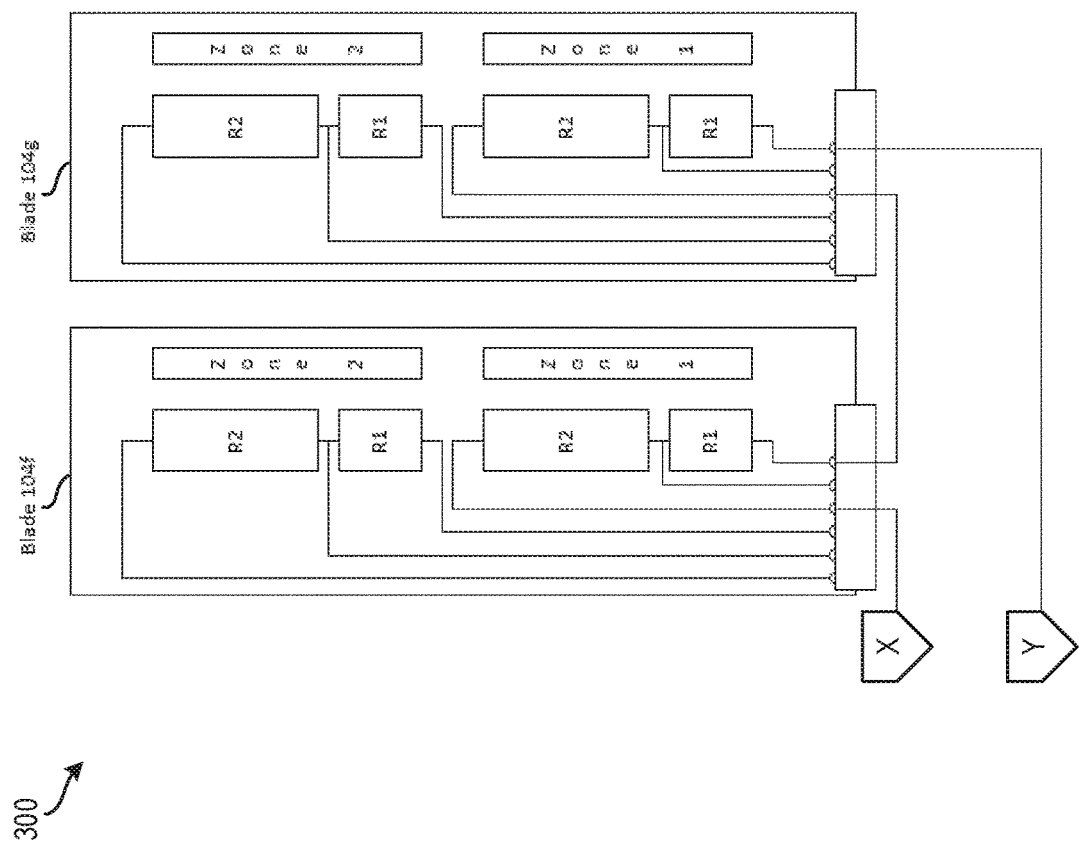

In this example, the blades 104 each include heating elements that define deicing zones. For example, the blade 104a includes heating elements 106a, 108a; similarly, the blades 104b, 104c, 104d, 104e, 104f, 104g include heating elements 106b, 106c, 106d, 106e, 106f, 106g (referred to collectively as "heating elements 106") and heating elements 108b, 108c, 108d, 108e, 108f, 108g (referred to collectively as "heating elements 108") respectively. According to one or more embodiments described herein, the heating elements 106, 108 are resistive circuits that, when current is passed through the restive circuits, generate heat. Examples of such resistive circuits are depicted in FIGS. 2, 3A, and 3B. The heating elements 106 form a first deicing zone 107 and the heating elements 108 form a second deicing zone 109. The first deicing zone 107 is formed radially about the center point 102 of the propeller 100 as shown using a first style of crosshatching in FIG. 1. The second deicing zone 109 is also formed radially about the center point 102 of the propeller 100 as shown using a second style of crosshatching in FIG. 1. In this way, the first deicing zone 107 and the second deicing zone 109 form adjacent, non-overlapping concentric rings about the center point 102 configured and arranged as shown.

The heating elements 106, 108 can include resistive circuits that generate heat to facilitate deicing. FIGS. 2, 3A, and 3B depict examples of such resistive circuits. For example, FIG. 2 depicts a circuit diagram of a circuit 200 for deicing a propeller according to one or more embodiments described herein. In this example, the circuit 200 is associated with a propeller having two blades 204a, 204b (collectively the "blades 204"). The blades 204 have a blade tip 210 and a blade root 211. The blade root is the portion of the blades 204 closest to the center point of the propeller (e.g., the center point 102 of FIG. 1).

The blades 204 include heating elements for deicing the respective blades. Deicing is performed by providing a current to the heating elements to cause the heating elements to generate heat. In particular, a three-phase power generation device 220 generates a current across each of its phases: Phase A, Phase B, Phase C (labeled "A," "B," and "C" respectively in FIG. 2) for each of two heating (deicing) zones 1 and 2. In some examples, a processing device 240 controls the heating of the propeller by enabling and disabling heating of the heating elements. For example, the processing device 240 can selectively activate and deactivate the heating elements in the zones, such as for particular periods of time. The processing device 240 can be any suitable processing device, processing circuit, etc., such as a field-programmable gate array, application-specific integrated circuit, central processing unit, special-purpose processor, microprocessor, digital signal processor, and the like, including combinations thereof. According to aspects of the present disclosure, the functionality described herein can be a combination of hardware and programming. The programming can be processor executable instructions stored on a tangible memory (not shown), and the hardware can include the processing device 240 for executing those instructions. Thus a system memory can store program instructions that when executed by the processing device 240 implement the logic described herein.

In particular, as shown, each of the blades 204 includes two heating (or deicing) zones: zone 1 and zone 2. For example, blade 204a includes zone 1 and zone 2; similarly, blade 204b includes zone 1 and zone 2. Each of the zones 1 and 2 of each of the blades 204 includes a heating element having two resistors R1, R2 configured and arranged as shown. The resistor R2 has a resistive value that is twice the resistive value of the resistor R1. For example, if the resistive value of R1 is 10Ω, the resistive value of R2 is 20Ω.

This relationship between the resistive values of R1, R2 in the circuit 200 ensures that the load across each phase of the three-phase power generation device 220 is balanced (i.e., substantially the same).

As an example, the three-phase power generation device 220 supplies a current across Phase A, Phase B, and Phase C for a first time period (e.g., 10 seconds) to zone 1. The current flows through the resistors R1, R2 in zone 1 of the blades 204. This is shown as zone 1 power 221. After the first time period expires, the three-phase power generation device 220 supplies a current across Phase A, Phase B, and Phase C for a second time period (e.g., 10 seconds) to zone 2. The current flows through the resistors R1, R2 in zone 2 of the blades 204. This is shown as zone 2 power 222. In this way, the power load across the phases of the three-phase power generation device 220 is balanced and the deicing of the blades 204 is also weight balanced.

To allow for a common heating element (i.e., "deicer") to be installed on each blade 204, each deicer uses six (6) electrical leads that are then interconnected or connected to the appropriate phase of electrical power via additional electrical wiring after installation on the propeller as shown in FIG. 2. In this example of a 2-bladed propeller, the load applied between Phase A and Phase B is R2 in zone 1 of blade 1. The load between Phase B and Phase C is R1 of Zone 1 of blade 104a plus R1 of zone 1 of blade 104b. The load between Phase C and Phase A is R2 in zone 1 of blade 104b. Since by design R2 is equal to R1+R1, the load on each phase pair (i.e., phase pairs AB, BC, and CA) is the same (i.e. R1+R1).

As another example resistive circuit, FIGS. 3A and 3B depict a circuit diagram of a circuit 300 for deicing a propeller according to one or more embodiments described herein. In this example, the circuit 300 is associated with a propeller having seven blades 104a-104g (collectively the "blades 204") as in FIG. 1 except that the interconnecting wiring for zone 2 is not shown for simplicity.

The blades 104 include heating elements for deicing the respective blades. Deicing is performed by providing a current to the heating elements to cause the heating elements to generate heat. In particular, a three-phase power generation device 320 generates a current across each of its phases: Phase A, Phase B, Phase C (labeled "A," "B," and "C" respectively in FIG. 2) for each of two heating (deicing) zones 1 and 2.

In particular, as shown, each of the blades 104 includes two heating (or deicing) zones: zone 1 and zone 2. For example, blade 104a includes zone 1 and zone 2; similarly, blades 104b-104g each includes zone 1 and zone 2. Each of the zones 1 and 2 of each of the blades 104 includes a heating element having two resistors R1, R2 configured and arranged as shown. The resistor R2 has a resistive value that is twice the resistive value of the resistor R1. For example, if the resistive value of R1 is 10Ω, the resistive value of R2 is 20Ω. This relationship between the resistive values of R1, R2 in the circuit 300 ensures that the load across each phase of the three-phase power generation device 320 is balanced (i.e., substantially the same).

As an example, the three-phase power generation device 320 supplies a current across Phase A, Phase B, and Phase C for a first time period (e.g., 10 seconds) to zone 1. The current flows through the resistors R1, R2 in zone 1 of the blades 104. This is shown as zone 1 power 321. After the first time period expires, the three-phase power generation device 220 supplies a current across Phase A, Phase B, and Phase C for a second time period (e.g., 10 seconds) to zone 2. The current flows through the resistors R1, R2 in zone 2 of the blades 104. This is shown as zone 2 power 322. In this way, the power load across the phases of the three-phase power generation device 320 is balanced and the deicing of the blades 104 is also weight balanced.

To allow for a common heating element (i.e., "deicer") to be installed on each blade 104, each deicer uses six (6) electrical leads that are then interconnected or connected to the appropriate phase of electrical power via additional electrical wiring after installation on the propeller as shown in FIGS. 3A and 3B for zone 1 (zone 2 is similarly interconnected but such connections are not shown for clarity). In this example of a 7-bladed propeller, the zone 1 load applied between Phase A and Phase B is R1 of blade 104a+R2 of blade 104a+R1 of blade 104b+R2 of blade 104b+R1 of blade 104c. The zone 1 load between Phase B and Phase C is R2 of blade 104c+R1 of blade 104d+R2 of blade 104d+R2 of blade 104e. The zone 1 load between Phase C and Phase A is, therefore, R1 of blade 104e+R1 of blade 104f+R2 of blade 104f+R1 of blade 104g+R2 of blade 104. Since by design R2=R1+R1, the load on each phase pair (AB, BC, and CA) is the same (i.e. 7×R1).

Figure 4:
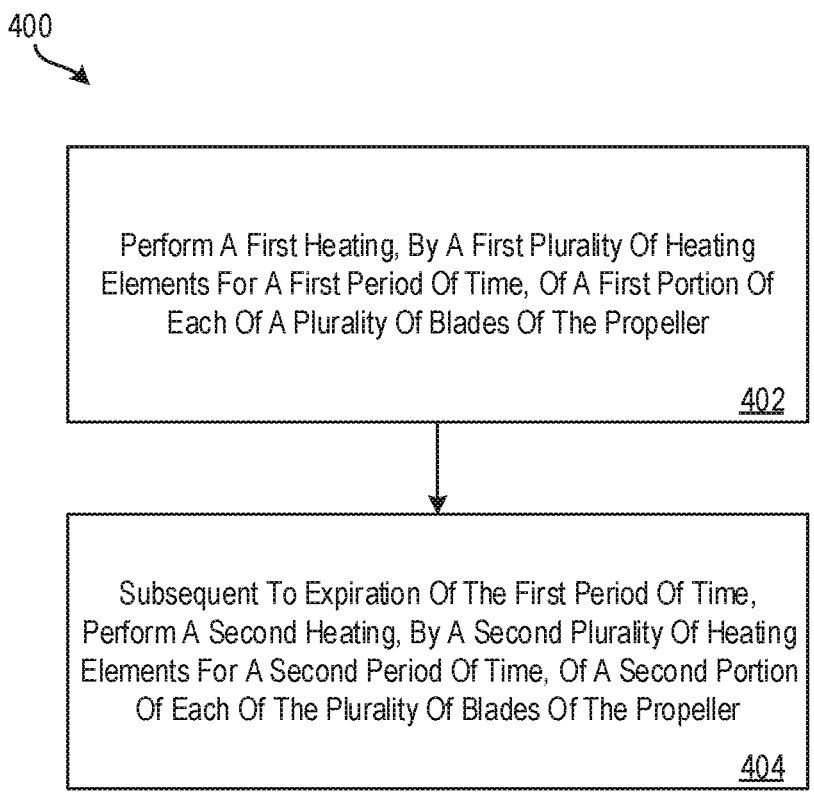
FIG. 4 depicts a flow diagram of a method for deicing a propeller according to one or more embodiments described herein.

FIG. 4 depicts a flow diagram of a method 400 for deicing a propeller, such as the propeller 100 of FIG. 1, according to one or more embodiments described herein. The example of FIG. 4 is described with respect FIGS. 1, 3A, and 3B but is not intended to be so limited.

At block 402, the method 400 includes performing a first heating, by a first plurality of heating elements (e.g., the heating elements 106) for a first period of time, of a first portion of each of a plurality of blades (e.g., the blades 104) of the propeller. The first portion of each of the plurality of blades of the propeller defines a first deicing zone (e.g., the first deicing zone 107). The first deicing zone is formed radially about a center point (e.g., the center point 102) of the propeller.

At block 404, the method 400 includes subsequent to expiration of the first period of time, performing a second heating, by a second plurality of heating elements (e.g., the heating elements 108) for a second period of time, of a second portion of each of the plurality of blades (e.g., the blades 104) of the propeller. The second portion of each of the plurality of blades of the propeller defines a second deicing zone (e.g., the second deicing zone 109). The second deicing zone is formed radially about the center point of the propeller. The second deicing zone differs from the first deicing zone (see, e.g., FIG. 1).

While performing the first heating (block 402) and while performing the second heating (block 404), a current is supplied to the respective first plurality of heating elements (e.g., the heating elements 106) and the second plurality of heating elements (e.g., the heating elements 108) from each of three phases (e.g., Phase A, Phase B, Phase C) of a three-phase power generation device (e.g., the three-phase power generation device 320) associated with the aircraft. A load on each of the three phases is balanced.

In some examples, as shown in FIGS. 3A and 3B, one or more of the first plurality of heating elements and/or one or more of the second plurality of heating elements can include a resistive circuit. For example, as shown in FIGS. 3A and 3B, each of the blades 104 includes resistors R1, R2 (the first resistive circuit) in the first deicing zone and similarly includes resistors R1, R2 (the second resistive circuit) in the second deicing zone. Together, the resistors R1, R2 of each blade 104 within the respective first or second deicing zone form a resistive circuit. The resistive value of the resistor R2 is approximately twice the value of the resistor R1. According to one or more embodiments described herein, each of the three phases (e.g., Phase A, Phase B, Phase C) supplies current to the first heating elements during the first heating; similarly, each of the three phases supplies current to the second heating elements during the second heating.

Additional processes also may be included. For example, according to one or more embodiments described herein, heating the second portion of each of the plurality of blades of the propeller occurs within a threshold time (e.g., less than 1 second, 3 seconds, 5 seconds, 10 seconds, etc.) subsequent to the expiration of the first period of time.

According to one or more embodiments described herein, subsequent to expiration of the first period of time, the method 400 includes waiting a third period of time before performing the second heating. Then, according to one or more embodiments described herein, subsequent to expiration of third period of time, the method 400 includes performing a third heating, by the first plurality of heating elements for the first period of time, the first portion of each of the plurality of blades of the propeller; and subsequent to expiration of the first period of time, performing a fourth heating, by the second plurality of heating elements for the second period of time, the second portion of each of the plurality of blades of the propeller.

According to one or more embodiments described herein, subsequent to the expiration of second period of time, the method 400 includes performing a third heating, by the first plurality of heating elements for the first period of time, the first portion of each of the plurality of blades of the propeller.

It should be understood that the process depicted in FIG. 4 represents an illustration, and that other processes may be added or existing processes may be removed, modified, or rearranged without departing from the scope of the present disclosure.

The technical effects and benefits include improving power load balancing in a deicing system powered by a three-phase power generation device. Particularly, the power load across the phases of the three-phase power generation device is balanced, regardless of how many blades or their configuration. Further, the deicing of the blades is also weight balanced, regardless of how many blades or their configuration.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method for deicing an aircraft propeller having a plurality of blades of an aircraft, the method comprising:
    performing a first heating, with current from a three phase generator by a first plurality of heating elements connected to a first portion of each of the plurality of blades, for a first period of time, the first portion of each of the plurality of blades of the propeller defining a first deicing zone, the first deicing zone being formed radially about a center point of the propeller; and
    subsequent to expiration of the first period of time, performing a second heating, by a second plurality of heating elements connected to a second portion of each of the plurality of blades, for a second period of time, the second portion of each of the plurality of blades of the propeller defining a second deicing zone, the second deicing zone being formed radially about the center point of the propeller, the second deicing zone differing from the first deicing zone,
    wherein while performing the first heating current from one phase of the three phase generator is applied to a first of the first plurality of heating elements on a first of the plurality of blades and current from another phase of the three phase generator is applied to a second of the first plurality of heating elements on a second of the plurality of blades;
    wherein, while performing the second heating, a current is supplied to the respective first plurality of heating elements and the second plurality of heating elements from each of three phases of the three-phase power generation device associated with the aircraft, a load on each of the three phases being balanced.

2. The method of claim 1, wherein one or more of the first plurality of heating elements comprises a first resistive circuit.

3. The method of claim 2, wherein performing the first heating comprises receiving the current from each of the three phases of the three-phase power generation device associated with the aircraft during the first period of time.

4. The method of claim 2, wherein the first resistive circuit comprises a first resistor and a second resistor, the second resistor having twice the resistance of the first resistor.

5. The method of claim 1, wherein one or more of the second plurality of heating elements comprises a second resistive circuit.

6. The method of claim 5, wherein performing the second heating comprises receiving the current from each of the three phases of the three-phase power generation device associated with the aircraft during the second period of time.

7. The method of claim 5, wherein the second resistive circuit comprises a third resistor and a fourth resistor, the fourth resistor having twice the resistance of the third resistor.

8. The method of claim 1, wherein heating the second portion of each of the plurality of blades of the propeller occurs within a threshold time subsequent to expiration of the first period of time.

9. The method of claim 1, further comprising:
    subsequent to expiration of the first period of time, waiting a third period of time.

10. The method of claim 9, further comprising:
    subsequent to expiration of the third period of time, performing a third heating, by the first plurality of heating elements for the first period of time, the first portion of each of the plurality of blades of the propeller; and
    subsequent to expiration of the first period of time, performing a fourth heating, by the second plurality of heating elements for the second period of time, the second portion of each of the plurality of blades of the propeller.

11. The method of claim 1, further comprising:
    subsequent to expiration of the second period of time, performing a third heating, by the first plurality of heating elements for the first period of time, the first portion of each of the plurality of blades of the propeller.

12. An aircraft comprising:
a propeller comprising a first plurality of heating elements disposed in a plurality of blades of the propeller and a second plurality of heating elements disposed in the plurality of blades of the propeller, wherein each of the plurality of first heating elements is disposed between a center point of the propeller and the respective each of the second heating elements;
a three-phase power generation device selectively providing a current to the first plurality of heating elements and the second plurality of heating elements; and
a processing device for executing computer readable instructions stored in a memory, the computer readable instructions controlling the processing device to perform operations comprising:
causing heating, by the first plurality of heating elements connected to a first portion of each of the plurality of blades, for a first period of time, the first portion of each of the plurality of blades of the propeller defining a first deicing zone, the first deicing zone being formed radially about a center point of the propeller; and
subsequent to expiration of the first period of time, causing heating, by the second plurality of heating elements connected to a second portion of each of the plurality of blades, for a second period of time, the second portion of each of the plurality of blades of the propeller defining a second deicing zone, the second deicing zone being formed radially about the center point of the propeller, the second deicing zone differing from the first deicing zone,
wherein, while performing the first heating current from one phase is applied to a first of the first plurality of heating elements on a first of the plurality of blades and current from another phase is applied to a second of the first plurality of heating elements on a second of the plurality of blades;
wherein, while performing the second heating, the current is supplied to the respective first plurality of heating elements and the second plurality of heating elements from each of three phases of the three-phase power generation device, a load on each of the three phases being balanced.

13. The aircraft of claim 12, wherein one or more of the first plurality of heating elements comprises a first resistive circuit.

14. The aircraft of claim 13, wherein performing the first heating comprises receiving the current from each of the three phases of the three-phase power generation device associated with the aircraft during the first period of time.

15. The aircraft of claim 13, wherein the first resistive circuit comprises a first resistor and a second resistor, the second resistor having twice the resistance of the first resistor.

16. The aircraft of claim 12, wherein one or more of the second plurality of heating elements comprises a second resistive circuit.

17. The aircraft of claim 16, wherein performing the second heating comprises receiving the current from each of the three phases of the three-phase power generation device associated with the aircraft during the second period of time.

18. The aircraft of claim 16, wherein the second resistive circuit comprises a third resistor and a fourth resistor, the fourth resistor having twice the resistance of the third resistor.

19. The aircraft of claim 12, wherein heating the second portion of each of the plurality of blades of the propeller occurs within a threshold time subsequent to expiration of the first period of time.

20. A deicing system for deicing a plurality of blades of a propeller, the deicing system comprising:
a first plurality of heating elements;
a second plurality of heating elements; and
a processing device for executing computer readable instructions stored in a memory, the computer readable instructions controlling the processing device to perform operations as recited in claim 1 comprising:
causing heating.

* * * * *